United States Patent [19]

Dietch et al.

[11] 4,217,521
[45] Aug. 12, 1980

[54] HIGH POTENTIAL STATIC DISCHARGE MEANS FOR TELEVISION CATHODE RAY TUBES

[75] Inventors: Leonard Dietch, Skokie; James W. Schwartz, Deerfield, both of Ill.

[73] Assignee: Zenith Radio Corporation, Glenview, Ill.

[21] Appl. No.: 862,893

[22] Filed: Dec. 21, 1977

[51] Int. Cl.² .................... H01J 29/00; H01J 31/00
[52] U.S. Cl. ................................................. 313/479
[58] Field of Search ............... 313/479, 450, 477, 364

[56] References Cited
U.S. PATENT DOCUMENTS

| | | | |
|---|---|---|---|
| 803,907 | 6/1927 | Delsing et al. | 313/479 |
| 2,409,514 | 10/1946 | Pratt | 313/450 |
| 2,771,566 | 11/1956 | Baracket | 313/450 X |
| 3,959,686 | 5/1976 | Davis et al. | 313/479 X |
| 3,996,491 | 12/1976 | Larson et al. | 313/479 |

FOREIGN PATENT DOCUMENTS 927280  5/1955  Fed. Rep. of Germany .......... 313/450
2704416 8/1977  Fed. Rep. of Germany.

Primary Examiner—Robert Segal
Attorney, Agent, or Firm—Ralph E. Clarke, Jr.

[57] ABSTRACT

This disclosure depicts a television picture tube subject to an undesired build-up of localized high-potential static charges and high-potential charge retention. The tube is characterized by a resistive coating deposited on at least one of the normally uncoated outer areas of the tube and in contact with the conductive coating to disperse any static charges by means of a flow of electrons through the resistive coating. The "rush" of electrons which may cause an annoying crackling sound upon tube turn-on and turn-off is attenuated thereby to suppress the sound, and any residual high-potential charges remaining after turn-off are discharged to ground.

1 Claim, 7 Drawing Figures

HIGH POTENTIAL STATIC DISCHARGE MEANS FOR TELEVISION CATHODE RAY TUBES

CROSS-REFERENCE TO RELATED PATENT APPLICATION

This application is related to but in no way dependent upon copending application to common ownership herewith: Ser. No. 803,907 filed June 6, 1977.

BACKGROUND AND PRIOR ART STATEMENT

This invention relates generally to television cathode ray picture tubes, and more specifically, to means for alleviating the build-up and retention of undesired localized high-potential static charges on the surface of the cathode ray tube envelope.

The standard circuits for supplying operating voltages to the components of a cathode ray tube and associated electron gun are shown in highly schematic form by FIG. 1. A cross-sectional view of a fragment 10 of a funnel of a cathode ray tube will be readily recognized by those skilled in the art. The section as shown comprises a glass envelope 12 with an anode button 14 passing therethrough and receiving a high voltage. Anode button 14 makes electrical contact with an inner conductive coating 16, usually comprised of colloidal graphite deposited on the inner surface of the funnel. An outer conductive coating 18 of similar material is also located on the funnel. Outer conductive coating 18, being grounded, does not contact anode button 14, but is kept away from anode button 14 by an electrically isolative gap 20 between outer conductive coating 18 and anode button 14.

Power supply 22 supplies potentials to the electrodes of electron gun 24; these potentials are in the range of a few volts for operation of the filaments (not shown) of electron gun 24 to as high as thirty-two kilovolts for operation of the accelerating anodes of gun 24. The relatively low potentials are shown as being supplied to electron gun 24 through leads 26. The aforesaid high potential is supplied through lead 28 to anode button 14, which is in electrical contact with inner conductive coating 16. The final accelerating anode of gun 24, anode 24A, receives the high potential conducted by inner conductive coating 16 through a plurality of "snubber" springs, which are not shown but which are represented schematically by connection 30. The outer conductive coating 18 is brought to electrical ground through lead 32 to complete the power supply circuit.

The glass 12 of the cathode ray tube funnel serves as the dielectric of a capacitor formed by the difference in electrical potential between outer conductive coating 18, which is shown as being at ground, or zero, potential, and the relatively high potential of inner conductive coating 16, which may be a potential of thirty-two kilovolts. The capacitor so formed serves as a component of the filter circuit of the power supply 22. This capacitor, in conjunction with other power supply components, acts to smooth out high-voltage peaks in the power supply circuit. The capacitor is characterized by a relatively large capacity—in the range of one to two thousand picofarads—a capacity due to the fact that inner conductive coating 16, and outer conductive coating 18 cover extensive areas of the inner and outer surfaces of the cathode ray tube funnel.

The large capacity of the capacitor so formed, and the high potentials involved in tube operation, can be the source of many problems common to the cathode ray picture tube art. These problems result mainly from the retention of the high potential charge by the aforedescribed capacitor, retention of the high potential charge on the anode button, and build up and retention of high-potential static charges on normally uncoated areas of the tube; that is, on bare glass areas.

It takes an appreciable length of time to completely discharge any capacitor. In a television cathode ray picture tube, the capacitive charge may persist for several seconds, hours, or even months after the television set has been turned off. One effect of this high potential charge retention may be a persistent glow visible on the television screen for several seconds after set turn-off. Further, charge retention of the capacitor can present a safety problem. When servicing a set, the service technician may not wait the considerable time it may take for the charge to disperse; as a consequence, the technician may experience an electrical shock. Under most conditions, the shock may constitute only an annoyance; however, under certain conditions (the presence of perspiration, physical contact with an electrical ground, etc.), the residual charge can present a definite hazard.

Even though the technician takes the precaution of momentarily shorting the anode button to ground, the shock condition can recur. The glass of the envelope which provides the dielectric becomes polarized, and may remain polarized even though the plates of the capacitor—the inner and outer conductive coatings—are deliberately discharged. After a period of time, the high potential charge will build up again due to the polarization of the glass and the condition contributing to shock will again be present. The high potential charge can be retained even after long periods of storage of the tube.

Any residual high potential charge remaining on the anode button after television set turn-off may result in a white dot appearing on the screen of the tube. Television circuits commonly include a bleeder resistor in the power supply to discharge the high potential on the anode button.

The build up and retention of localized high-voltage static charges on normally uncoated areas of the tube envelope can result in an annoying "crackling" sound which may be heard upon set turn-on and turn-off. This crackling sound is due to a "rush" of electrons which creates an audible microscopic sparking on the tube surface. The crackling sound has its origin in the electrical energizing and deenergizing of the inner conductive coating upon tube turn-on and turn-off. FIG. 1A illustrates another fragment of tube envelope 10 of FIG. 1. This is a section of the envelope wherein a bare glass area 15 is located opposite inner conductive coating 16, such as the area of the neck, or of the flange. When the external power supply is turned ON as indicated schematically by switch 13, inner conductive coating 16 will rise, or be "driven upward" to a potential of thirty kilovolts, for example. Bare glass area 15 instantly rises to about the same potential by capacitive coupling. The effect is indicated highly schematically by capacitor 17 and 19. Capacitor 17 represents the equivalent capacity of the relatively large effective capacitor formed by inner conductive coating 16, the dielectric supplied by glass 12 of the envelope, and the charge-collecting bare glass area 15, the surface of which acts in effect as a capacitor plate. Relatively small capacitor 19 represents an equivalent capacity formed in conjunction with the "environment" surrounding the tube envelope. These capacitive effects, plus a modicum of electrical leakage of the glass 12 of the tube envelope, results in the aforedescribed "rush" of electrons and the consequent crackling sound. If switch 13 remains in the "ON" position for a sufficient length of time, "discharged" portions of glass surface 15 may tend to revert to a potential close to ground potential. When switch 13 is turned to OFF and inner conductive coating 16 is driven to ground potential, the potential of previously "discharged" bare glass area 15 is capacitively "driven downward", charging its potential by essentially thirty kilovolts, and causing previously "discharged" areas to assume a potential of essentially 30 kilovolts below ground. The rush of electrons recurs, this time in the opposite direction, and the crackling sound is again heard.

Although primarily a "cosmetic acoustic" problem potentially annoying to television set users, the basic cause of the crackling sound may, under certain conditions, be the precursor of more serious arcing able to destroy components and circuits. The electron gun is highly susceptible to damage from such arcing, as are external electronic circuits such as the video drivers and circuits comprising transistors or integrated circuits. The magnitude of some arcing currents can also result in the actual puncturing and destruction of the envelope of the cathode ray tube itself.

Destructive arcs can be initiated by such localized high-potential static charges. So serious is the problem of arcing that elaborate measures are commonly taken to completely suppress arcing, or at least to alleviate its effects. Referring again to FIG. 1, an arc-suppressing impedance shown schematically by block 34, may be introduced into the circuit between inner conductive coating 16 and the accelerating anode 24A of gun 24 to suppress or otherwise ameliorate any arcing that may develop in the region of the electron gun. To protect external circuits, another arc-suppression circuit, indicated schematically by block 36, may be located outside the cathode ray tube envelope, comprising a part of the external electronic circuits. Typical circuits and components for suppressing arcing and/or reducing its effects include decoupling networks which act as buffers; also, spark gaps, diodes, filters, gas-discharge lamps and various resistive devices. These may be termed "contingency components" that may become useful only upon occurrence of an arc, and as such, contribute little or nothing to improving television set performance, while constituting a substantial cost factor.

The build up of localized high potential static charges in gap 20 between anode button 14 and outer conductive coating 18 may trigger an arc therebetween. The localized areas constitute discrete islands of high potential static charge which may link together to provide a path for arcing. A compound known as "corona dope" may be required to prevent such localized charge build up and consequent arcing. Corona dope is a spray which is applied to an area around an anode button, such as the area of gap 20 to prevent the build up of such charges. If the use of corona dope is necessary, a vinyl anode cap cannot be used because the material of the corona dope degrades the resistive properties of the vinyl. As a result, when corona dope is required, it becomes necessary to use a more expensive anode cap comprised of silicone, a material which is unaffected by the corona dope. Practical means to prevent arcing between the anode button and the outer conductive coating would result in cost savings in that of less costly vinyl anode cap can be used. Also, the cost of the material and the labor required for the application of corona dope could be eliminated.

Prior Art Statement

The referent copending application of Delsing et al, Ser. No. 803,907, discloses a getter-flash-tolerant anti-static coating around the beam egress of an electron gun on the inner surface of a neck of a cathode ray tube. The coating is composed of a highly resistive but non-insulative material having a leafy, coral-like, plateauless real surface having no continuous areas thereacross capable of being conductivized by normal getter material deposits to present an arc-encouraging surface by-pass path. The method of making the resistive material is disclosed in referent copending application Ser. No. 803,907. This application is cited of interest in that it discloses an anti-static coating deposited on the inner surface of a cathode ray tube envelope, and discloses the composition of the coating; however, this coating also has value in the present application, as will be shown.

A patent to Philips Gloeilampenfabrieken NV, (DT 2704-416) is cited of interest only in that it discloses a photoconductive layer deposited on a television tube. A slightly conductive coating is applied to the surface of the tube, covered with a layer of photoconductive material and uniformly charged. Any conductive blemishes such as a dust particle or a pinhole in the photoconductive layer, causes the charge to leak away to the slightly conductive coating at the point of blemish. Subsequently charged particles are repelled to fill up blemishes.

OBJECTS OF THE INVENTION

It is a general object of this invention to provide an improved high potential static discharge means for the outer surface of television cathode ray tube envelopes.

It is another general object to reduce or eliminate various high-potential charge phenomena such as an after-glow or a white dot on the screen upon turn-off, and audible crackling sounds due to the build up and retention of high potential charges on the outer surface of the cathode ray tube envelope.

It is a less general object to provide for safe discharge of possibly hazardous high potentials remaining on the outer surface of the tube after tube turn-off.

It is another object to reduce the undesired effects of contaminants such as dust, grease and fingerprints on certain external areas the tube envelope which may conductivize the surface and contribute to arcing.

It is a specific object to obviate the need for many of the various compounds, components and circuits presently required to eliminate the undesired effects of high potential build up and retention of charges on the outer surface of television cathode ray tubes.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, in the several figures of which like reference numerals identify like elements, and in which:

DESCRIPTION OF THE PREFERRED EMBODIMENT

For a better understanding of the present invention, together with any other further objects, advantages and capabilities thereof, reference is made to the following specification and depended claims in connection with the aforedescribed drawings.

Figure 1:
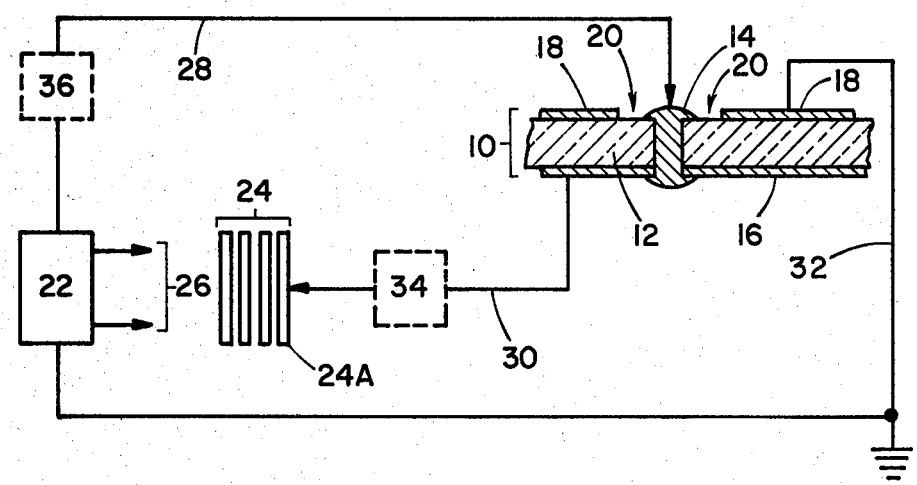
FIG. 1 is a highly schematic view of a fragment of the funnel of a prior art cathode ray tube having an anode button therethrough, with associated components and circuits shown in block form.
Figure 1A:
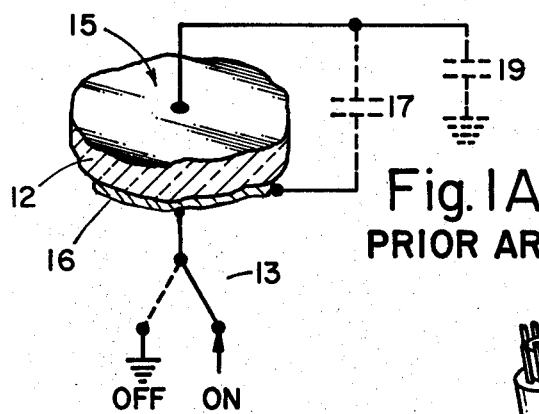
FIG. 1A shows another fragment of the tube envelope wherein the outer surface is bare glass.
Figure 2:
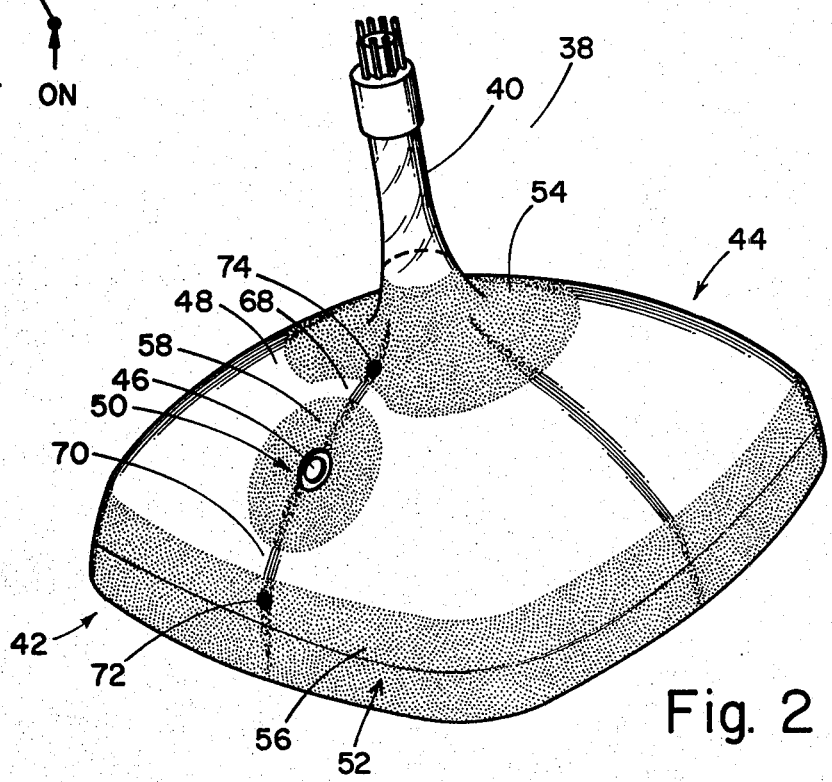
FIG. 2 is a view in perspective of the envelope of a television picture tube embodying the invention.

The preferred embodiments of the invention are shown by FIGS. 2-5. Referring initially to FIG. 2, there is shown a cathode ray tube envelope of well-known configuration. Cathode ray tube 38 has a glass envelope comprising a neck 40, faceplate 42, and a funnel 44. Funnel 44 has therethrough an anode button 46 for receiving a high potential supplied by an external power supply (not shown), as is well known in the art. Tube 38 has a conductive coating 48 nominally at zero potential deposited on the outside surface of funnel 44. Conductive coating 48 serves as a component of a power supply filter capacitor which in turn comprises a component of the aforesaid power supply. Conductive coating 48 is configured so as to provide an electrically isolative gap 50 around anode button 46. The surface of the glass envelope comprising cathode ray tube 38 has a pattern of normally uncoated areas such as the region of the neck 40, the gap 50 around anode button 46, and, in tubes having flanged faceplates, a rearwardly extending flange 52 of faceplate 42. The anode button 46 receives a high potential, typically about 30 kilovolts, from the power supply. The normally uncoated gap 50 electrically isolates anode button 46 from conductive coating 48.

A major purpose of the claimed invention is to provide for the safe and expedient discharge of the aforedescribed high-potential static charges that may build up and remain on the outer surface of the cathode ray tube envelope. A cathode ray tube having high potential static discharge means according to the invention is characterized by having a resistive coating deposited on one or more of the aforedescribed normally uncoated areas, and in electrical contact with conductive coating 48 so as to disperse any such static charges by means of a flow of electrons thru the resistive coating.

FIG. 2 shows the improved means for discharging high potential static charges from a television cathode ray tube envelope according to this invention. A resistive coating 54 according to the invention is shown as being deposited on the normally uncoated area in a band around the envelope of the tube 38 in the region of the neck 40, and in electrical contact with conductive coating 48. Cathode ray tube 38 is shown as having a rearwardly extending flange 52; resistive coating 56 is shown as covering said flange, and in electrical contact with conductive coating 48. Further, a resistive coating 58 is shown as extending across gap 50 around anode button 46 between anode button 46 and conductive coating 48, and in electrical contact with anode button 46.

Figure 5:
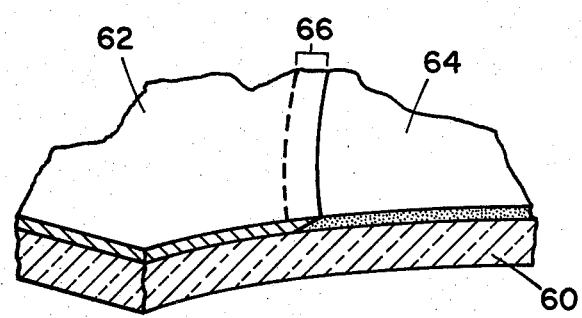
FIGS. 3, 4 and 5 are cutaway views in perspective of fragments of a television picture tube envelope, showing various external coating configurations according to the invention; and, FIG. 6 is a side elevational view of the tube illustrated in FIG. 2 showing the beneficial effect of the conductive strips according to the invention.
Figure 3:
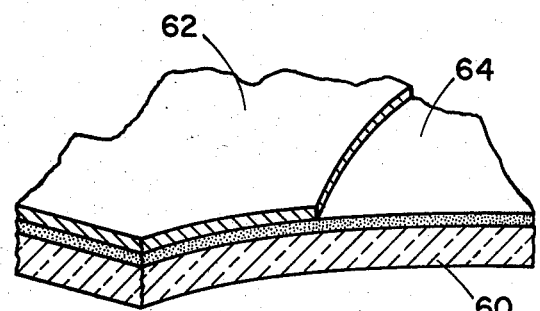
Figure 4:
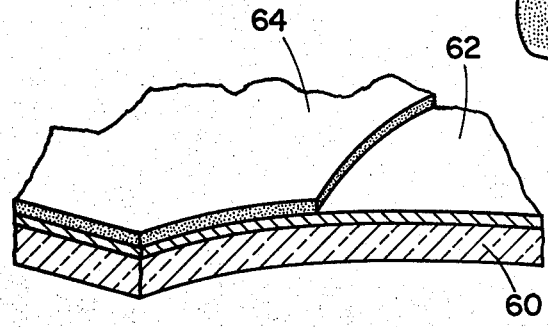

The aforedescribed resistive coatings are in electrical contact with the conductive coating, according to the invention. With reference to FIG. 3, a fragment of a picture tube envelope is shown which includes glass 60 of the envelope and conductive coating 62 in contact with a resistive coating 64, applied to the outside surface of the envelope. According to the preferred embodiment of the invention, resistive coating 64 is shown as extending under at least a portion of conductive coating 62. It is within the scope of the invention that resistive coating 64 could as well extend over at least a portion of conductive coating 62, as shown by FIG. 4. FIG. 5 shows another embodiment of the invention wherein the conductive coating 62 and the resistive coating 64 are in abutting relationship in their deposition on glass 60. To ensure positive electrical contact between the two coatings, conductive coating 62 and resistive coating 64 may be overlapped as shown by overlap area 66.

Figure 6:
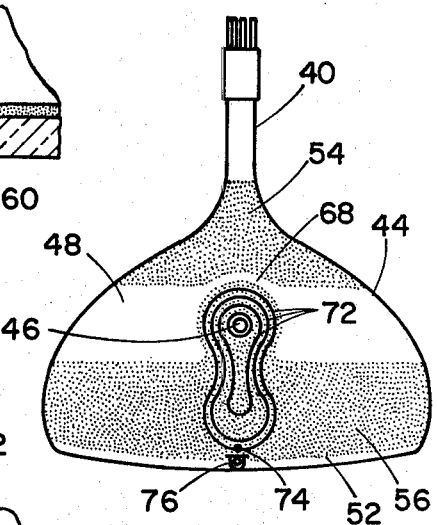

With reference again to FIG. 2, conductive strips 68 and 70 will be observed at the periphery of the area of gap 50 around anode button 46. Conductive strip 68 provides for separation of resistive coating 54 in the neck area and the resistive coating 58 in gap 50. Conductive strip 70 provides for separation of the resistive coating in gap 50 and the resistive coating 56 on flange 52. The function of the conductive strips is shown schematically by FIG. 6, wherein the tube of FIG. 2 is illustrated as being without conductive strip 70. Equipotential lines 72 indicate schematically the hypothetical distribution of potentials around anode button 46, and extending into the field of resistive coating 56 on flange 52. The potential of anode button 46 is, for example, thirty kilovolts and the potential at point 74 may be, for example, about eight kilovolts. The propinquity of this potential to a bracket 76, for example, could result in an undesired discharge between point 74 and bracket 76. In effect, the conductive strip 70 eliminates any "long paths" indicated by equipotential lines 72, which may induce an undesired discharge.

The beneficial effect of the conductive strips according to the invention is shown by strip 68, which provides for a short path through resistive coating 58 located around and in contact with the anode button 46. Also as a result of the presence of conductive strip 68, the area of resistive coating 54 in the region of the neck 40 is isolated from the high potential of anode button 46, and becomes, effectively, a field essentially at ground potential able to discharge any undesired build-up of potentials in the region of neck 40.

It is to be noted that such conductive strips are required only on smaller picture tubes such as shown by FIG. 2, wherein, for example, resistive coating 58 on gap 50 would otherwise come in direct contact with resistive coating 56 on flange 52 without the intercession of conductive strip 70. On larger picture tubes, such conductive strips would obviously not be needed as gap 50 (which may have, for example, a nominal radius of three inches) would be proportionately smaller and thus be fully surrounded by conductive material. As a result, there would be no localized areas in a resistive field remote from a grounded conductor.

A primary benefit of the invention as described is the prevention of the persistent glow that may be visible on the viewing screen for several seconds after set turn-off due to the retention of the capacitive charge of the tube.

Also, the rapid dispersion of the capacitive charge eliminates a potential shock hazard to manufacturing and service personnel.

The resistive coating 58 in the area of gap 50 extends across gap 50 around anode button 46 and between anode button 46 and conductive coating 48. Resistive coating 58 which is an electrical contact with anode button 46, provides a path for discharge to ground of any high-potential charges, and makes possible the elimination of any external circuit provision for discharging anode button 46, such as a bleeder resistor in the high-voltage power supply. Positive discharge of the anode button upon turn-off provides another benefit in that, if for some reason, the anode button is not discharged, the retained charge could present a significant shock hazard to personnel. A further benefit is provided by the discharge of the anode button in that the duration of the white dot which may otherwise appear on the viewing screen after tube turn-off is reduced.

Prevention of build up of localized areas of high potential static charges is particularly important around the anode button. "Islands" of such charges may link together to provide arcing paths between the anode button 46 and conductive coating 48. The means according to the invention provides a path for discharge to ground and consequent dispersion of such charges.

Yet another benefit is provided by the invention in that the build up and retention of high potential static charges on normally uncoated areas of the tube envelope is prevented. One effect of the build up of static charges on such areas is the annoying "crackling" sound attributable to a rush of electrons upon tube turn-on and turn-off. The static discharge means according to the invention provides for attenuating the rush of electrons and thus suppresses the crackling.

Destructive arcs can be prevented or otherwise inhibited by dispersing static charges wherever they occur on the tube outer envelope. An arc occurring externally as a result of charge build up could trigger a train of arcs that could extend into the envelope to pass through vulnerable components therein, such as the electron gun. As a result of the application of this invention, the need for various compounds, components and circuits for arc suppression can be reduced or completely eliminated.

With regard to the physical characteristics and composition of the resistive coating applied to the cathode ray tube envelope according to this invention, the coating must be compatible with the fabrication processes of the tube during manufacture. Also, the resistive coating must, upon application, become a tenacious, permanent film able to withstand friction due to handling. Further, the resistive coating must lend itself to standard means of application such as brushing, dipping or spraying, while providing a resistive film of uniform thickness. The resistance of the resistive coating according to the invention preferably has a value in the range of $2 \times 10^8$ to $5 \times 10^{10}$ ohms/square. To provide a resistance in this range, the resistive coating would be, for example, a few ten-thousandths of an inch thick, depending on the type of material. One material suitable for the resistive coating according to the invention is a frit manufactured by Corning Glass Works, Corning New York, identified by that manufacturer as Glass 8464.

It is preferable that the resistive coating have a resistance in the aforedescribed range of $2 \times 10^8$ to $5 \times 10^{10}$ ohms/square. If the resistive coating has a resistance appreciably greater than the highest value of the range cited, the coating will tend to retain a high potential static charge rather than dispersing it. On the other hand, too low a DC resistance; that is a resistance value much less than $2 \times 10^8$ ohms/square, is undesirable in that the consequent increase in conduction between the anode button 46 and the adjacent conductive coating 48, for example, would result in an unacceptable consumption of high voltage power.

Contaminants such as dust, grease and fingerprints can conductivize the surface of the resistive coating. The result can be an undesired short-circuiting of the resistive coating, nullifying its effective resistance and providing a path for arcing. The effect of fingerprints and other contaminants on the efficacy of the resistive coating can largely be ameliorated by using a resistive coating as described and claimed in the referent copending application Ser. No. 803,907, assigned to assignee of this invention, and titled: "Cathode Ray Tube Having Getter Flash Tolerant Resistive Element." It is an aspect of the present invention to utilize the resistive coating of the 803,907 application on the outside surface of a cathode ray tube. The resistive coating of the 803,907 application comprises a high-resistivity material so widely and deeply concavitated and contorted at or below the minimal surface thereof, the real surface of said coating being so shadowed and extended in area relative to the nominal surface that surface contaminants such as dust, grease, and fingerprints are effectively dispersed and fragmented by the coating into isolated conductive islands so the tendency of such contaminants to conductivize the surface of the coating is rendered tolerably insignificant.

The method of making the contaminant-resistive coating as disclosed in the copending 803,907 application described as follows. The resistive frit coating may have the following composition, prepared in the form of suspension: 7.2 grams of ball-milled resistive frit supplied by Corning Glass Works of Corning, New York as Glass 8464; 1.8 grams of vehicle F1300A supplied by the Pierce and Stevens Company of Buffalo, New York, or equivalent; 1.8 grams of camphor; and 1.2 grams of ethyl propionate or equivalent. The suspension may be applied by brushing, spraying, dipping or other suitable process. The thickness of the coating will, to a degree, affect the resistance thereof—the thinner the coating, the greater its resistance. By way of example, the coating may be a few ten-thousandths of an inch thick.

The surface irregularizing agent in the formulation being discussed is camphor. Crystallization of the camphor from the suspension causes the surface of the coating to have the extremely irregular surface topography which can provide the aforedescribed contaminant-resistance.

Upon volatilization of the solvents from the suspension, and after camphor crystallization has performed the function of surface irregularization, the in-process coating displays the desired irregular topography. The next step in the method of coating fabrication under description is to bake the coating in air; for example, for 20 minutes at about 430° C. This has the effect of devitrifying the frit to form an extremely hard and abrasion-resistant coating. The desired coating resistivity can be selected by predetermining the amount of metallic oxide or other modifier in the resistive frit and by controlling the thickness of the coating.

The invention is not limited to the particular details of the method depicted and other modifications and applications are contemplated. For example, with regard to the tube shown by FIG. 2, the tube may have patterns of coatings different from these shown. The conductive coating 48 may cover a greater or lesser area than shown; flange 52 may be uncoated; resistive coating 54 may extend farther toward the base of the tube, etc. In brief, certain changes may be made in the above-described method without departing from the true spirit and scope of the invention herein involved. It is intended therefore that the subject matter in the above depiction shall be interpreted as illustrative and not in a limiting sense.

We claim:

1. In a television cathode ray tube having a glass envelope comprising a neck, a faceplate having a rearwardly extending supporting flange, and a funnel including an anode button therethrough for receiving a high potential, and having a conductive coating nominally at ground potential normally deposited on the outside surface of said funnel to serve as a component of a power supply filter capacitor and configured so as to provide an electrically isolative gap around said anode button, said surface also having a pattern of normally uncoated areas including said gap around said anode button, said tube being subject to an undesired build-up of localized high-potential static charges on one or more of said normally uncoated areas adjacent to said conductive coating resulting in an annoying crackling sound due to a rush of electrons upon tube turn-on and turn-off, with said tube also being subject to an undesired high-potential charge retention after turn-off, said tube being characterized by having a resistive coating deposited on at least one of said normally uncoated areas including said gap around said anode button between said anode button and said grounded conductive coating and in electrical contact with said anode button and said resistive coating, and a resistive coating deposited in a band around said envelope in the region of said neck and in electrical contact with said conductive coating, said mutually isolated resistive coatings around said anode button and on said neck being separated one from the other by a conductive strip forming part of said conductive coating effective to isolate said coating in the region of said neck from the high potential of said anode button, said resistive coating in the region of said neck being a field at ground potential, the contact of said resistive coating in the region of said neck with said conductive coating causing a dispersion of any such static charges by means of a flow of electrons through said resistive coating whereby said rush of electrons is attenuated to suppress said crackling sound and any residual high-potential charges are discharged to ground.

* * * * *